US00RE42189E

(19) United States
(12) Reissued Patent
Imanaka et al.

(10) Patent Number: US RE42,189 E
(45) Date of Reissued Patent: Mar. 1, 2011

(54) SINGLE-LAYER TYPE ELECTROPHOTOSENSITIVE MATERIAL AND IMAGE FORMING APPARATUS USING THE SAME

(75) Inventors: Yukikatsu Imanaka, Osaka (JP); Hiroaki Iwasaki, Osaka (JP); Yuji Tanaka, Osaka (JP); Masakatsu Hayashi, Osaka (JP)

(73) Assignee: Kyocera Mita Corporation, Osaka (JP)

(21) Appl. No.: 12/585,448

(22) Filed: Sep. 15, 2009

Related U.S. Patent Documents

Reissue of:
(64) Patent No.: Re. 39,516
Issued: Mar. 13, 2007
Appl. No.: 10/964,296
Filed: Oct. 14, 2004

Which Is a Reissue of:
(64) Patent No.: 6,190,812
Issued: Feb. 20, 2001
Appl. No.: 09/595,906
Filed: Jun. 20, 2000

(30) Foreign Application Priority Data

Oct. 25, 1999 (JP) ..... 302914

(51) Int. Cl.
*G03G 5/09* (2006.01)
*G03G 13/22* (2006.01)

(52) U.S. Cl. ..... 430/83; 430/100; 430/134

(58) Field of Classification Search ..... 430/83, 430/100, 134
See application file for complete search history.

(56) References Cited

U.S. PATENT DOCUMENTS 4,264,695 A * 4/1981 Kozima et al. ..... 430/58.25
5,087,543 A 2/1992 Narita et al.
5,324,610 A 6/1994 Tanaka et al.

(Continued)

FOREIGN PATENT DOCUMENTS

EP 0506387 9/1992
EP 0863442 9/1998
EP 0 863442 9/1998

(Continued)

OTHER PUBLICATIONS

Fumio Nakagawa et al.; "Electrophotography" vol. 33, 1; (1994) P35–237; The charging system for electrophotographic system; Mar. 10, 1994.

(Continued)

*Primary Examiner*—Mark A Chapman
(74) *Attorney, Agent, or Firm*—Frommer Lawrence & Haug LLP

(57) ABSTRACT

The present invention provides a single-layer type electrophotosensitive material comprising a conductive substrate and a photosensitive layer formed on the conductive substrate, wherein the photosensitive layer contains a phthalocyanine compound as an electric charge generating material, a hole transferring material and an electron transferring material in a binder resin, and that a difference in absolute value between a plus polarity sensitivity and a minus polarity sensitivity measured under the conditions of an exposure wavelength of 780 nm and an exposure energy of 1.0 μJ/cm$^2$ is not more than [[500]] 312 V, and a reversal development type digital image forming apparatus using the electrophotosensitive material, which does not include a charge neutralizing step.

11 Claims, 2 Drawing Sheets

U.S. PATENT DOCUMENTS

| | | | | | |
|---|---|---|---|---|---|
| 5,474,868 | A | * | 12/1995 | Adachi et al. | 430/58.05 |
| 5,492,784 | A | * | 2/1996 | Yoshikawa et al. | 430/59.2 |
| 5,498,502 | A | * | 3/1996 | Muramoto et al. | 430/49 |
| 5,548,387 | A | | 8/1996 | Fukami et al. | |
| 5,622,798 | A | | 4/1997 | Kimoto | |
| 5,863,688 | A | | 1/1999 | Watanabe et al. | |
| 5,867,755 | A | | 2/1999 | Sato | |
| 5,932,383 | A | * | 8/1999 | Nakata et al. | 430/58.75 |
| 5,994,012 | A | | 11/1999 | Watanabe et al. | |
| 6,090,514 | A | | 7/2000 | Kakui et al. | |

FOREIGN PATENT DOCUMENTS

| | | |
|---|---|---|
| JP | 03-033751 | 2/1991 |
| JP | 03-256050 | 11/1991 |
| JP | 3-256050 | 11/1991 |
| JP | 04-295853 | 10/1992 |
| JP | 05-150481 | 6/1993 |
| JP | 06-236048 | 8/1994 |
| JP | 06-342219 | 12/1994 |
| JP | 8-22136 | 1/1996 |
| JP | 08-022136 | 1/1996 |
| JP | 9-77763 | 3/1997 |
| JP | 09-073182 | 3/1997 |
| JP | 09-077763 | 3/1997 |
| JP | 9-151157 | 6/1997 |
| JP | 09-160379 | 6/1997 |
| JP | 09-281728 | 10/1997 |
| JP | 9-281729 | 10/1997 |
| JP | 09-281729 | 10/1997 |
| JP | 10-115945 | 5/1998 |
| JP | 10-239874 | 9/1998 |
| JP | 10-251194 | 9/1998 |
| JP | 11-109657 | 4/1999 |
| JP | 11-119458 | 4/1999 |
| JP | 2000-019748 | 1/2000 |
| JP | 228637 | 8/2001 |
| JP | 312075 | 11/2001 |
| JP | 2001-305755 | 11/2001 |

OTHER PUBLICATIONS

Yasuhiro Yamaguchi et al.; "Electrophotography" vol. 30, 3(1991) p. 274–281; Application of Unsymmetrical Diphenoquinone Derivatives to Xerography ( II ).

Yasufumi Mizuta, et al., "Japan Hard Copy"'97 p. 21–24; Synthesis and xerographic properties of novel naphthoquinone; Published Date: Jul. 9, 1997.

Sales Information in the U.S.; Brother Annual Report HL–1040; Release Date(HL–1040): Jun. 1998; Date we were aware: Feb. 3, 2006.

Brother Overview HL–1040; Release Date(HL–1040): Jun. 1998; Date we were aware: Feb. 3, 2006.

PC World HL–1240; Release Date(HL–1240): Sep. 1999; Date we were aware: Nov. 14, 2005.

Brother laser printer Service Manual HL–1240/1250; Published Date: Aug. 1999.

* cited by examiner

SINGLE-LAYER TYPE ELECTROPHOTOSENSITIVE MATERIAL AND IMAGE FORMING APPARATUS USING THE SAME

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue.

This application claims priority to Japanese Patent Application No. 1999-302914, filed on Oct. 25, 1999, the disclosure of which is incorporated by reference in its entirety.

BACKGROUND OF THE INVENTION

The present invention relates to a single-layer type electrophotosensitive material which is used in digital image forming apparatuses such as electrophotosensitive copying machine, facsimile and laser beam printer, and a digital image forming method using the same.

More particularly, the present invention relates to a single-layer type electrophotosensitive material, which does not generate a memory image even when using in a reversal development type digital image forming apparatus including no charge neutralizing step, and a reversal development type digital image forming method using the same, which does not include a charge neutralizing step.

Recently, an organic photosensitive material has widely been used because of its easy production, low cost, wide range of choice of photosensitive materials such as electric charge transferring material, electric charge generating material and binder resin, and high functional design freedom as compared with a conventional inorganic photosensitive material.

The organic photosensitive material includes, for example, single-layer type photosensitive material wherein an electric charge transferring material (hole transferring material, electron transferring material) is dispersed in the same photosensitive layer, together with an electric charge generating material, and multi-layer type photosensitive material comprising an electric charge generating layer containing an electric charge generating material and an electric charge transferring layer containing an electric charge transferring material, which are mutually laminated. The single-layer type photosensitive material has attracted special interest recently because it has such an advantage that optical characteristics can be improved due to simple layer structure, excellent productivity and less interfaces between layers.

On the other hand, an image forming apparatus using an electrophotosensitive system is capable of charging a photosensitive material (principal charge step), exposing an image to form a static latent image (exposure step), developing the static latent image with a toner at a state where a developing bias voltage is applied (development step) transferring the formed toner image to a transfer paper (transfer step), and fixing to form an image. The residual toner on the photosensitive material is cleaned by a urethane blade (cleaning step) and the residual electric charges on the photosensitive material are neutralized by LED (charge neutralizing step).

To reduce the size of the image forming apparatus and initial cost, various trials of omitting the cleaning step and charge neutralizing step have been made.

The image forming apparatus using an electrophotosensitive system includes, for example, digital and analogue copying machines, facsimile and laser beam printer. In particular, a reversal development system for developing using a toner having the same polarity as that of a charging voltage to be applied to the photosensitive material in the charge step has widely been used in a digital image forming apparatus.

However, the following problems such as generation of a memory image occur when using a conventional electrophotosensitive material in a reversal development type digital image forming apparatus.

<Transfer memory>

When using an electrophotosensitive material in a reversal development type digital image forming apparatus, a transfer voltage to be applied to the electrophotosensitive material in a transfer step is usually applied through a transfer medium (paper) without being applied directly to the electrophotosensitive material, and the transfer voltage is not applied when the transfer medium does not pass through the transfer step.

However, on-off timing of the transfer voltage is very difficult and portion to be applied directly to the photosensitive material is often generated with respect to front/rear portions of the transfer medium. That is, application of the transfer voltage starts before a transferring apparatus is covered with the front portion of the transfer medium. Furthermore, the transfer voltage is continuously applied even if portion of the transferring apparatus is exposed by passage of the rear end of the transfer medium so that the transfer voltage is applied directly to the photosensitive material at said portion.

In case of a positively charging single-layer type photosensitive material, since the polarity of the voltage to be applied in the transferring apparatus is negative, negative space electric charges are remained at the portion of the photosensitive material to which a negative voltage has been applied. Generally, a single-layer type photosensitive material has sensitivity in both polarities so that negative space electric charges are neutralized in the following charge neutralizing step.

However, in case where the sensitivity of the positively charging single-layer type photosensitive material to the negative polarity is drastically inferior (mobility of the electron transferring material is very small) or the photosensitive material is used in the image forming apparatus including no charge neutralizing step, negative space electric charges are not sufficiently neutralized and a reduction in potential is caused by an influence of space electric charges even if the photosensitive material is positively charged in the following charge step. Furthermore, a difference in sensitivity appears in the development step, thus causing such problems that said portion turns into black in the image (memory image).

<Exposure memory>

After passing through the exposure step and development step, positive electric charges on the surface of the positively charging single-layer type photosensitive material are uniformly neutralized in the charge neutralizing step usually, and the photosensitive material is positively charged uniformly in the following charge step.

Similar to the case of the transfer memory, the negative space electric charge density of the exposed portion is larger than that of the non-exposed portion and a difference in potential appears in the following charge step and the memory image is liable to be generated in case where the sensitivity of the positively charging single-layer type photosensitive material to the negative polarity is inferior and the photosensitive layer is used in the image forming apparatus including no charge neutralizing step.

SUMMARY OF THE INVENTION

Thus, an object of the present invention is to provide a single-layer type electrophotosensitive material, which hardly generates a exposure memory and a transfer memory and does not generate a memory image even when using in a reversal development type image forming apparatus including no charge neutralizing step.

Another object of the present invention is to provide a reversal development typedigital image forming apparatus using the single-layer type electrophotosensitive material, which does not include a charge neutralizing step.

The present inventors have intensively studied to attain the above objects and found the fact that a single-layer type electrophotosensitive material comprising a conductive substrate and a photosensitive layer formed on the conductive substrate, characterized in that the photosensitive layer contains a phthalocyanine compound as an electric charge generating material, a hole transferring material and an electron transferring material in a binder resin, and that a difference in absolute value between a plus polarity sensitivity and a minus polarity sensitivity measured under the conditions of an exposure wavelength of 780 nm and an exposure energy of 1.0 μJ/cm$^2$ is not more than [[500]] 312 V hardly generates an exposure memory and a transfer memory and does not generate a memory image even when using in a reversal development type image forming apparatus including no charge neutralizing step. They have further studied based on this finding, thus completing the present invention.

The present invention includes the following inventions:

(1) a single-layer type electrophotosensitive material comprising a conductive substrate and a photosensitive layer formed on the conductive substrate, wherein the photosensitive layer contains a phthalocyanine compound as an electric charge generating material, a hole transferring material and an electron transferring material in a binder resin, and a difference in absolute value between a plus polarity sensitivity and a minus polarity sensitivity measured under the conditions of an exposure wavelength of 780 nm and an exposure energy of 1.0 μJ/cm$^2$ is not more than [[500]] 312 V;

(2) The single-layer type electrophotosensitive material according to the term (1), wherein the absolute value of the plus polarity sensitivity is smaller than that of the minus polarity sensitivity;

(3) The single-layer type electrophotosensitive material according to the term (2), which contains, as the hole transferring material, a compound represented by the general formula (1):

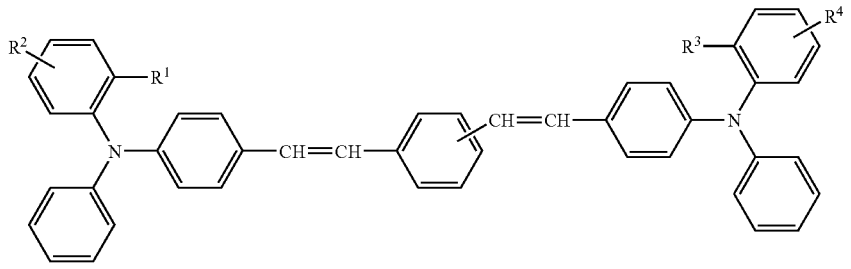

wherein $R^1$ and $R^3$ are the same or different and each represents an alkyl group which may have a substituent, an aryl group which may have a substituent, or an aralkyl or alkoxy group which may have a substituent; and $R^2$ and $R^4$ are the same or different and each represents a hydrogen atom or an alkyl or alkoxy group which may have a substituent, provided that $R^2$ and $R^4$ are hydrogen atoms when $R^2$ and $R^4$ are substituted at the para-position;

(4) The single-layer type electrophotosensitive material according to the term (2), which contains, as the electron transferring material, at least one selected from the group of compounds represented by the general formula (2):

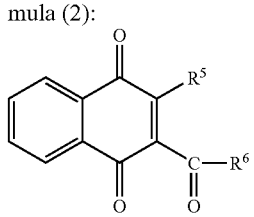

wherein $R^5$ represents a halogen atom, or an alkyl or aryl group which may have a substituent; and $R^6$ represents an alkyl or alkoxy group which may have a substituent, or a group: —O—$R^{6a}$, which represents an alkyl or aryl group which may have a substituent;

the general formula (3):

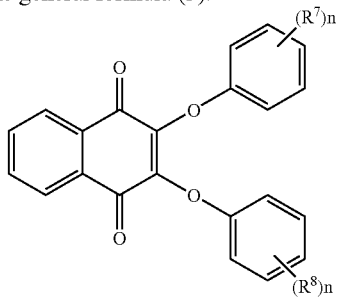

wherein $R^7$ and $R^8$ are the same or different and each represents an alkyl group, a halogenated alkyl group, an aryl group, an aralkyl group, an alkoxy group, an aryloxy group, an aralkyloxy group, an acyl group, an alkoxycarbonyl group, an aryloxycarbonyl group, an aralkyloxycarbonyl group, or a nitro group; and n represents an integer of 0 to 3;

the general formula (4):

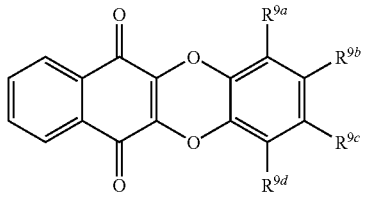

wherein $R^{9a}$, $R^{9b}$, $R^{9c}$ and $R^{9d}$ are the same or different and each represents a hydrogen atom, or an alkyl or aryl group which may have a substituent; and the general formula (5):

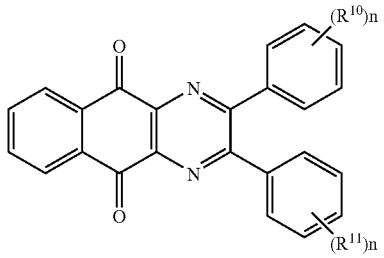

wherein $R^{10}$ and $R^{11}$ are the same or different and each represents an alkyl group, a halogenated alkyl group, an aryl group, an aralkyl group, an alkoxy group, an haryloxy group, an aralkyloxy group, an acyl group, an alkoxycarbonyl group, an aryloxycarbonyl group, an aralkyloxycarbonyl group, or a nitro group, and n represents an integer of 0 to 3;

(5) The single-layer type electrophotosensitive material according to the term (2), which contains, as the hole transferring material, a compound represented by the general formula (1) and, as the electron transferring material, a compound represented by the general formula (2).

(6) The single-layer type electrophotosensitive material according to the term (2), wherein the content of the phthalocyanine compound is from 0.1 to 4.0% by weight based on the weight of the binder resin;

(7) The single-layer type electrophotosensitive material according to the term (2), which contains, as the binder resin, a bisphenol Z type polycarbonate resin having a weight-average molecular weight of 15,000 to 100,000;

(8) The single-layer type electrophotosensitive material according to the term (2), wherein the film thickness of the photosensitive layer is from 10 to 35 μm;

(9) A method of producing a single-layer type electrophotosensitive material comprising a conductive substrate and a photosensitive layer formed on the conductive substrate, the photosensitive layer containing a phthalocyanine compound as an electric charge generating material, a hole transferring material and an electron transferring material in a binder resin, wherein the photosensitive layer is formed by selecting the phthalocyanine compound, hole transferring material, electron transferring material and binder resin so that a difference in absolute value between a plus polarity sensitivity and a minus polarity sensitivity is not more than [[500]] 312 V under the measuring conditions of an exposure wavelength of 780 nm and an exposure energy of 1.0 μJ/cm$^2$.

(10) The method of producing a single-layer type electrophotosensitive material according to the term (9), wherein at least one selected from the group of the compounds represented by the general formula (2), (3), (4) and (5) of the term (4) is contained as the electron transferring material; and

(11) A reversal development type digital image forming apparatus using the single-layer electrophotosensitive material of the term (1), comprising at least a principal charge step, an exposure step, a development step and a transfer step along the forward direction of the electrophotosensitive material, wherein a voltage to be applied in the transfer step has a polarity reverse to a voltage to be applied in the charge [step] *step, which does not include a charge neutralizing step.*

In the present invention, as described above, when using an electrophotosensitive material wherein a difference in absolute value between a plus polarity sensitivity and a minus polarity sensitivity measured under the conditions of an exposure wavelength of 780 nm and an exposure energy of 1.0 μJ/cm$^2$ is not more than [[500]] 312 V, an exposure memory and a transfer memory are drastically reduced. The reason is considered as follows. That is, the smaller a difference in absolute value of the sensitivity between a plus polarity and a minus polarity, the better the transferring balance between holes and electrons generated in the photosensitive layer. Thus, the memory is reduced.

As described above, the absolute value of the plus polarity sensitivity is smaller than that of the minus polarity sensitivity, that is, a positively charging type electrophotosensitive material is the most common because design of an electron transferring material having large mobility is difficult and the mobility of the electron transferring material is smaller than that of the hole transferring material and, furthermore, ozone is hardly generated in the image forming apparatus in the above single-layer type electrophotosensitive material.

The single-layer type electrophotosensitive material according to the present invention preferably includes a positively charged type one as referred to in the above terms (3) to (8).

In the present invention, the positively charging single-layer type electrophotosensitive material preferably contains the compound represented by the general formula (1) as the hole transferring material and at least one of the compounds represented by the general formulas (2), (3), (4) and (5) as the electron transferring material. The reason is as follows. That is, by using the compound having high hole transferability or electron transferability, the sensitivity to the positive or negative polarity is improved, which is very effective to reduce the memory.

As described in the term (6), even when using in a reversal development type digital image forming apparatus including no charge neutralizing step, the memory image is not generated because the single-layer type electrophotosensitive material of the present invention has a small memory.

As described above, even if the single-layer type electrophotosensitive material of the present invention is used in a reversal development type digital image forming apparatus including no charge neutralizing step, a memory image is not generated because of very small exposure memory and transfer memory.

DISCLOSURE OF THE INVENTION

Figure 1:
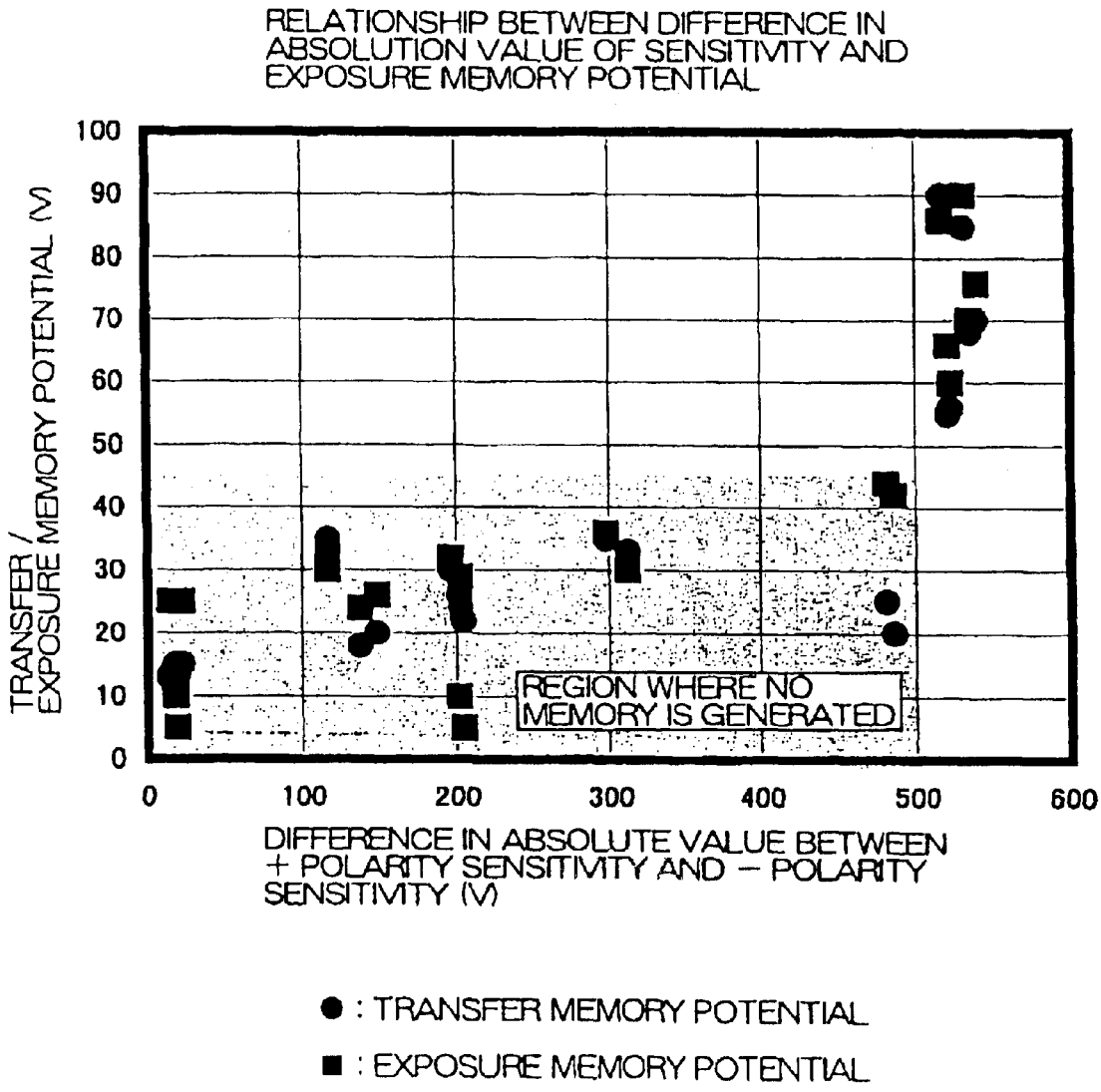
FIG. 1 is a graph showing a relationship between a transfer memory potential and an exposure memory potential, and a difference in absolution value of sensitivity between a plus polarity and a minus polarity of single-layer type electrophotosensitive materials of Examples and Comparative Examples.

Various materials used in the single-layer type electrophotosensitive material of the present invention will be described in detail hereinafter.

Electric charge generating agent>

When using laser as a light source in a digital image forming apparatus, a semiconductor laser and LED are exclusively used in view of small size, cheap price and simplicity. Accordingly, an organic photosensitive material having sensitivity in a wavelength range from 700 to 850 nm is required. As the electric charge generating material which satisfies the above requirement and used in the organic photosensitive material, for example, polycyclic quinone compound, pyrylium compound, squalium compound, phthalocyanine compound and azo compound have been suggested or put into practice. In the single-layer type electrophotosensitive material of the present invention, various phthalocyanine compounds are used.

In general, the phthalocyanine compound includes, for example, metal-free phthalocyanine (CGM-1) containing no center metal; titanyl phthalocyanine (CGM-2) which has intensively been developed, recently; and metal phthalocyanine containing a center metal, such as aluminum phthalocyanine, vanadium phthalocyanine, cadmium phthalocyanine, antimony phthalocyanine, chromium phthalocyanine, copper 4-phthalocyanine, germanium phthalocyanine, iron phthalocyanine, chloroaluminum phthalocyanine, chloroindium phthalocyanine, chlorogallium phthalocyanine, magnesium phthalocyanine, dialkyl phthalocyanine, tetramethyl phthalocyanine, and tetraphenyl phthalocyanine. The crystal form that can be used may be any of α, β, γ, δ, ϵ, σ, x and τ forms.

<COM-1>

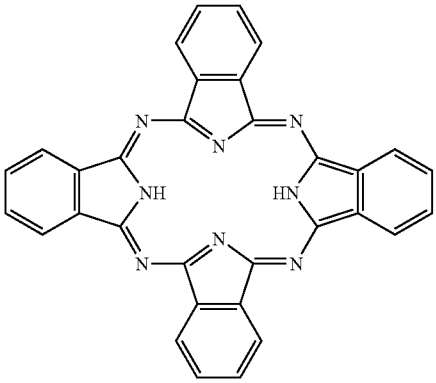

-continued

<COM-2>

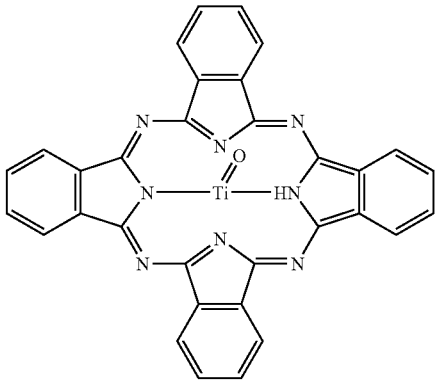

The phthalocyanine compound is preferably contained in the amount of 0.1 to 4.0% by weight based on the weight of the binder resin. When the content of the phthalocyanine compound exceeds 4% by weight, a memory becomes larger. The reason is as follows. That is, since carries are incorporated into a trap of the photosensitive layer to generate residual carries as a memory, the number of residual carriers are increased due to excess number of carrier. On the other hand, when the content is less than 0.1% by weight, it becomes difficult to put into practice because of poor photosensitivity.

<Hole transferring material>

As the hole transferring material used in the single-layer type electrophotosensitive material of the present invention, a stilbene compound represented by the general formula (1) can be used particularly preferably. When using the stilbene compound as the hole transferring material, the stilbene compound may be contained alone or at least one of them may be contained. That is, various hole transferring materials may be contained, together with the stilbene compound.

Various hole transferring materials include nitrogen-containing cyclic compounds, for example, oxadiazole compound such as 2,5-di(4-methylaminopheny))-1,3,4-oxadiazole, styryl compound such as 9-4-(diethylaminostyryl)anthracene, carbazole compound such as polyvinylcarbazole, organic polysilane compound, pyrazoline compound such as 1-phenyl-3(p-dimethylaminophenyl)pyrazoline, hydazone compound, triphenylamine compound, indole compound, oxadiazole compound, isoxazole compound, thiazole compound, thiadiazole compound, imidazole compound, pyrazole compound, and triazole compound.

The content of the hole transferring material is preferably from 5 to 500% by weight, and more preferably from 25 to 200% by weight, based on the weight of the binder resin.

<Electron transferring material>

As the electron transferring material used in the single-layer type electrophotosensitive material of the present invention, a quinone compound represented by the general formula (2), (3), (4) or (5) can be used particularly preferably. When using the quinone compound as the electron transferring material, the quinone compound may be contained alone or at least one of them may be contained. That is, other electron transferring materials may be contained, together with the quinone compound.

Other electron transferring materials include electron attractive substances, for example, pyrene compound, carbazole compound, hydrazone compound, N,N-dialkylaniline compound, diphenylamine compound, triphenylamine compound, triphenylmethane compound, tetracyanoethyl, tetracyanoquinoedimethane, chloroanil, bromoanil, 2,4,7-trinitro-9-fluorenone, 2,4,5,7-tetranitro-9-fluorenone, 5 2,4,7-trinitro-9-dicyanomethylenefluorenone, 2,4,5,7-tetranitroxanthone, and 2,4,8-trinitrothioxanthone, or those prepared by polymerizing these electron attractive substances.

The content of the electron transferring material is preferably from 5 to 100% by weight, and more preferably from 10 to 80% by weight, based on the weight of the binder resin.

<Binder resin>

As the binder resin in which the above respective components are dispersed, for example, there can be used various resins used conventionally in the photosensitive layer.

There can be used, for example, thermoplastic resins such as styrene-butadiene copolymer, styrene-acrylonitrile copolymer, styrene-maleic acid copolymer, acrylic copolymer, styrene-acrylic acid copolymer, polyethylene, ethylene-vinyl acetate copolymer, chlorinated polyethylene, polyvinyl chloride, polypropylene, ionomer, vinyl chloride-vinyl acetate copolymer, alkyd resin, polyamide, polyurethane, polycarbonate, polyacrylate, polysulfone, diallyl phthalate resin, ketone resin, polyvinyl butyral resin, and polyether resin; crosslinkable thermosetting resins such as silicone resin, epoxy resin, phenol resin, urea resin, and melamine resin; and photocurable resins such as epoxy acrylate and urethane acrylate. These binder resins can be used alone, or two or more kinds of them can be used in combination.

Particularly preferred resin includes, for example, bisphenol Z type monomer and bisphenol Z type polycarbonate derived from phosgene, such as Panlight manufactured by Teijin Chemicals Co., Ltd. and PCZ manufactured by Mitsubishi Gas Chemicals Co., Ltd.

The weight-average molecular weight of the binder resin is preferably within a range from 15,000 to 100,000.

In addition to the above respective components, various conventionally known additives such as antioxidants, radical scavengers, singlet quenchers, deterioration inhibitors (e.g. ultraviolet absorbers), softeners, plasticizers, surface modifiers, extenders, thickeners, dispersion stabilizers, waxes, acceptors, and donors can be incorporated into the single-layer type electrophotosensitive material of the present invention as far as these additives do not exert a deleterious influence on electrophotosensitive characteristics. To improve the sensitivity of the photosensitive layer, for example, known sensitizers such as terphenyl, halonaphthoquinones, and acenaphthylene may be used in combination with the electric charge generating material.

In the single-layer type electrophotosensitive material, a barrier layer may be formed between the conductive substrate and photosensitive layer as far as it does not inhibits the characteristics of the photosensitive material.

In the single-layer type electrophotosensitive material of the present invention, the film thickness of the photosensitive layer is preferably within a range from about 10 to 35 μm. When the film thickness exceeds 35 μm, the memory becomes large. The reason is considered as follows. That is, as the film thickness of the photosensitive layer increases, dark decay increases to reduce the charging capability, whereby an influence of the memory is liable to be exerted. Alternatively, a trap increase by an increase in absolute quantity of the constituting materials of the photosensitive layer. On the other hand, when the film thickness is less than 10 μm, the sensitivity is drastically lowered by removal of the film, thereby making it difficult to put into practice.

As described hereinbefore, the single-layer type electrophotosensitive material according to the present invention includes a preferable embodiment which contains a compound represented by the general formula (1) as the hole transferring material and a compound represented by the general formula (2) as the electron transferring material. Especially, it is more preferably to select HTM-1 as a compound represented by the general formula (1) and ETM-1 as a compound represented by the general formula (2).

The single-layer type electrophotosensitive material comprises a conductive substrate and a single photosensitive layer formed on the conductive substrate. This photosensitive layer is formed by dissolving or dispersing the electric charge generating material, hole transferring material, electron transferring material and binder resin in a proper solvent, coating the conductive substrate with the resulting coating solution and drying the coating solution.

As the conductive substrate on which the photosensitive layer is formed, for example, various materials having the conductivity can be used. Examples thereof include metallic simple substances such as iron, aluminum, cooper, tin, platinum, silver, vanadium, molybdenum, chromium, cadmium, titanium, nickel, palladium, indium, stainless steel, and brass; plastic materials prepared by depositing or laminating the above metal; and glasses coated with aluminum iodide, tin oxide, and indium oxide.

The conductive substrate may be in the form of a sheet or drum according to the structure of the image forming apparatus to be used. The substrate itself may have the conductivity, or the surface of the substrate may have the conductivity. The conductive substrate may be preferably those having a sufficient mechanical strength on use.

When the photosensitive layer is formed by the coating method, a dispersion is prepared by dispersing and mixing the above hole transferring material, electric charge generating material, electron acceptor and binder resin, together with a proper solvent, using a known method such as roll mill, ball mill, attritor, paint shaker, and ultrasonic dispersing equipment, and then the resulting dispersion is coated by using a known means and dried.

As the solvent for preparing the dispersion, various organic solvents can be used. The organic solvent includes, for example, alcohols such as methanol, ethanol, isopropanol, and butanol; aliphatic hydrocarbons such as n-hexane, octane, and cyclohexane; aromatic hydrocarbons such as benzene, toluene, and xylene; halogenated hydrocarbons such as dichloromethane, dichloroethane, chloroform, carbon tetrachloride, and chlorobenzene; ethers such as dimethyl ether, diethyl ether, tetrahydrofuran, ethylene glycol dimethyl ether, and diethylene glycol dimethyl ether; ketones such as acetone, methyl ethyl ketone, and cylohexanone; esters such as ethyl acetate and methyl acetate; and dimethylformaldehyde, dimethylformamide, and dimethyl sulfoxide. These solvents can be used alone, or two or more kinds of them can be used in combination.

To improve the dispersion properties of the hole transferring material, electric charge generating material and electron acceptor, and the smoothness of the surface of the photosensitive layer, for example, surfactants and leveling agents may be used.

On the other hand, the image forming apparatus of the present invention is a reversal development type digital image forming apparatus using the single-layer type electrophotosensitive material of the term (1), comprising at least a principal charge step, an exposure step, a development step and a transfer step along the forward direction of the electrophotosensitive material, characterized in that a voltage to be applied in the transfer step has a polarity reverse to a voltage to be applied in the charge step. Examples of the image forming apparatus include digital copying machine, facsimile and laser beam printer.

Even if the single-layer type electrophotosensitive material of the present invention is used in the above image forming apparatus including no charge neutralizing step, no memory image is generated because of very small transfer and exposure memories.

As described above, the cleaning step may be omitted sometimes, similar to the charge neutralizing step, in order to reduce the size of the image forming apparatus and initial cost.

EXAMPLES

The following Examples and Comparative Examples further illustrate the present invention in detail. The following embodiments are illustrative, and they should not be construed to limit the technical scope of the present invention.

Examples 1 to 8

2.0 Parts by weight of a X type metal-free phthalocyanine (CGM-1) as the electric charge generating material, 70 parts by weight of a hole transferring material (HTM-1) represented by the general formula (1), 40 parts by weight of electron transferring materials (ETM-1 to ETM-8) represented by the general formulas (2), (3), (4) and (5), 100 parts by weight a bis-Z type polycarbonate resin having a weight-average molecular weight of 30,000 as the binder resin and 800 parts by weight of tetrahydrofuran were dispersed or dissolved in a ball mill for 24 hours to prepare a coating solution for single-layer type photosensitive layer. Then, an alumina tube as the substrate was coated with the coating solution according to a dip coating method, followed by hot-air drying at 125° C. for 30 minutes to form a single-layer type photosensitive material having a photosensitive layer of 20 μm in a film thickness.

Comparative Examples 1 to 3

In the same manner as in Examples 1 to 7, except that ETM-9 to ETM-11 were used as the electron transferring material, single-layer type photosensitive materials were produced.

<HTM-1>

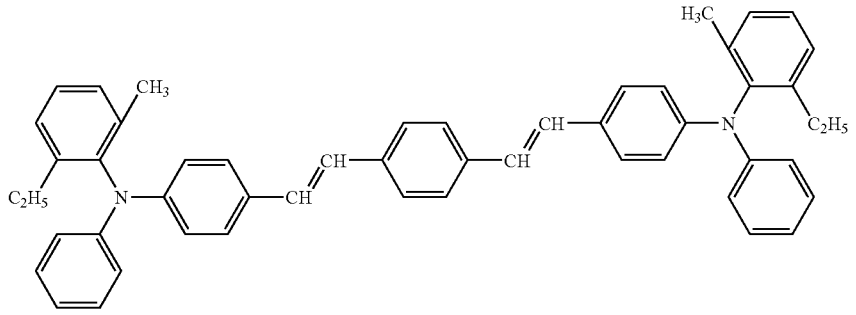

<ETM-1>

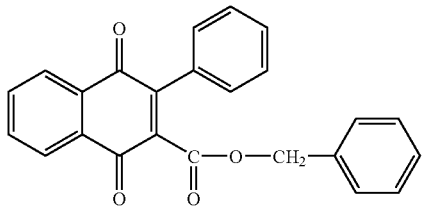

<ETM-2>

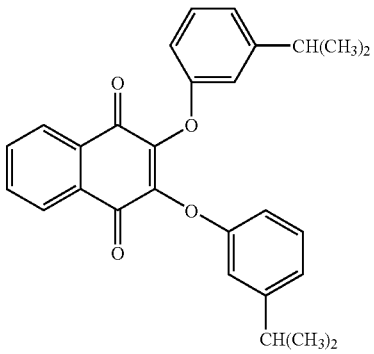

<ETM-3>

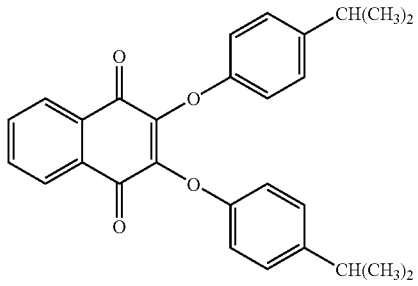

<ETM-4>

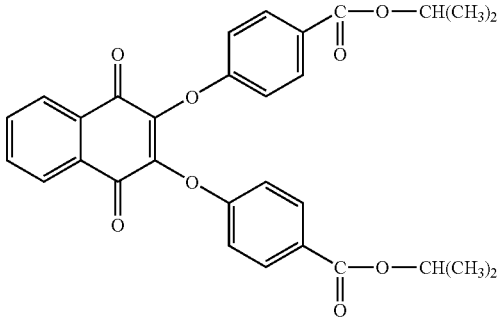

-continued

<ETM-5>

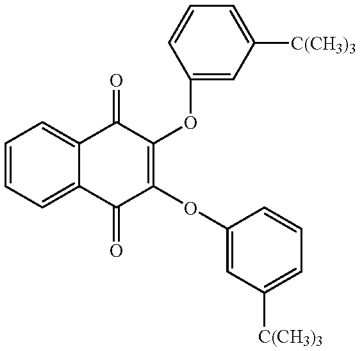

<ETM-6>

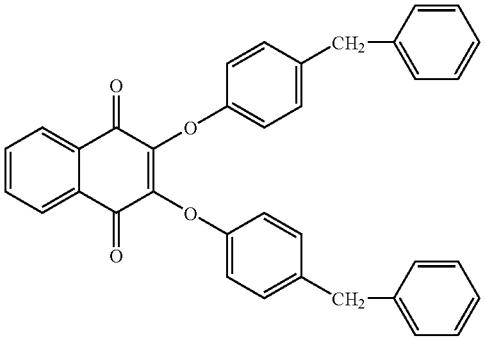

<ETM-7>

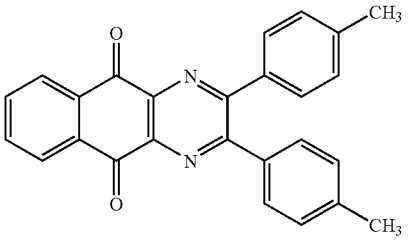

<ETM-8>

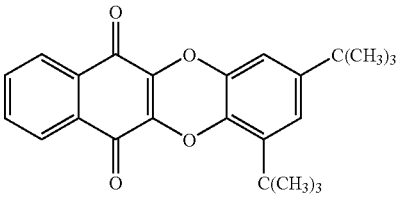

<ETM-9>

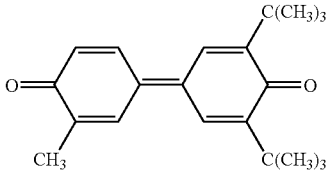

<ETM-10>

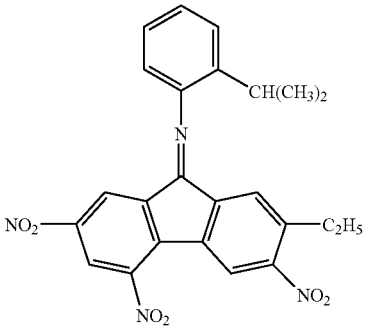

<ETM-11>

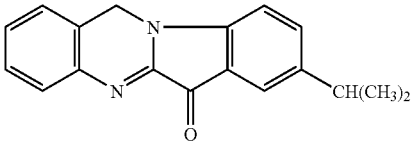

Examples 9 to 16

In the same manner as in Examples 1 to 8, except that titanyl phthalocyanine (CGM-2) was used as the electric charge generating material, single-layer type photosensitive materials were produced.

Comparative Examples 4 to 6

In the same manner as in Comparative Examples 1 to 3, except that titanyl phthalocyanine (CGM-2) was used as the electric charge generating material, single-layer type photosensitive materials were produced.

With respect to the single-layer type photosensitive materials of the respective Examples and Comparative Examples, the following respective characteristics were evaluated. The evaluation results are shown in Tables 1 and 2. Among these data, a relationship between a transfer memory potential, an exposure memory potential, and a difference in absolution value between a plus polarity sensitivity and a minus polarity sensitivity is shown in FIG. 1.

<Evaluation of plus polarity sensitivity>

Using a drum sensitivity tester (manufactured by GENTEC Co. under the trade name of GENTEC SINCIA 30 M)), a voltage was applied to the electrophotosensitive materials of the respective Examples and Comparative Examples to charge the surface at +800 V. Then, the surface of each photosensitive material (exposure time: [[100 msec]] 50 msec.) was irradiated (exposure energy: 1.0 μJ/cm$^2$) with monochromic light having a wavelength of 780 nm (half-width: 20 nm, light intensity: 20 μW/cm$^2$) from white light of a halogen lamp as an exposure light source through a band-pass filter, and then a surface potential at the time at which 500 msec. have passed since the beginning of exposure was measured as a potential after exposure $V_{LP}$ (V). The smaller the potential after exposure, the higher the sensitivity of the photosensitive material.

[Evaluation of minus polarity sensitivity]

In the same manner as in case of the <evaluation of plus polarity sensitivity>, except that a voltage was applied to the electrophotosensitive materials of the respective Examples and Comparative Examples to charge the surface at −800 V using a drum sensitivity tester (manufactured by GENTEC Co. under the trade name of GENTEC SINCIA 30 M)), a surface potential at the time at which 500 msec. have passed since the beginning of exposure was measured as a potential after exposure $V_{LN}$ (V)

<Evaluation of transfer memory potential>

After the electrophotosensitive materials of the respective Examples and Comparative Examples were installed in a multifunction printer Antico 40 excluding a charge neutralizing lamp, manufactured by KYOCERA-MITA Co., Ltd., a surface potential on application of no transfer bias and a surface potential on application of a transfer bias after the following charge step were measured and a difference between them was taken as a transfer memory potential. The case where the transfer memory potential is 45 V or less at which no transfer memory image is generated was rated "Pass", whereas, the case where the transfer memory potential is 45 V or more was rated "Fail".

<Evaluation of exposure memory potential>

After the electrophotosensitive materials of the respective Examples and Comparative Examples were installed in a multifunction printer Antico 40 excluding a charge neutralizing lamp, manufactured by KYOCERA-MITA Co., Ltd., a surface potential on no exposure and a surface potential on exposure after the following charge step were measured and a difference between them was taken as an exposure memory potential. Similar to the case of the transfer memory potential, the case where the exposure memory potential is 45 V or less at which no transfer memory image is generated was rated "Pass", whereas, the case where the exposure memory potential is 45 V or more was rated "Fail".

<Evaluation of transfer memory image>

Figure 2:
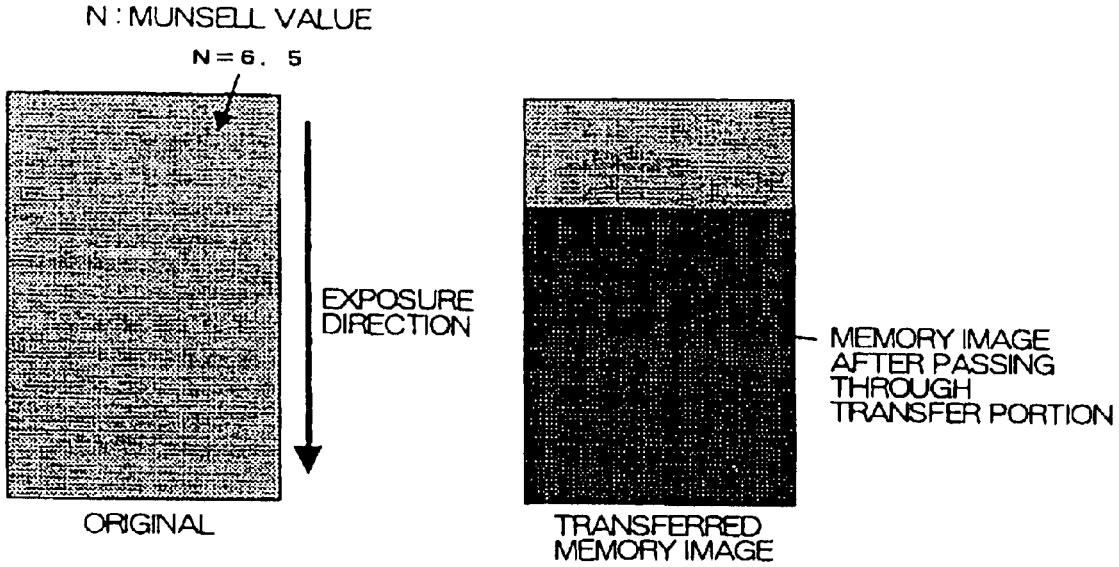
FIG. 2 is a diagram showing an original for evaluation of a transfer memory image, and a transfer memory image.

After the electrophotosensitive materials of the respective Examples and Comparative Examples were installed in a multifunction printer Antico 40 excluding a charge neutralizing lamp, manufactured by KYOCERA-MITA Co., Ltd., a printing test was carried out and it was visually judged whether a transfer memory image is generated or not. As shown in FIG. 2, the transfer memory image refers to an image wherein a black lateral band was generated in a drum longitudinal direction by a reduction in surface potential of the photosensitive material at the portion to which the transfer bias was applied in case where the printing test was carried out using an original having a gray front surface (Munsell value: N=6.5).

<Evaluation of exposure memory image>

Figure 3:
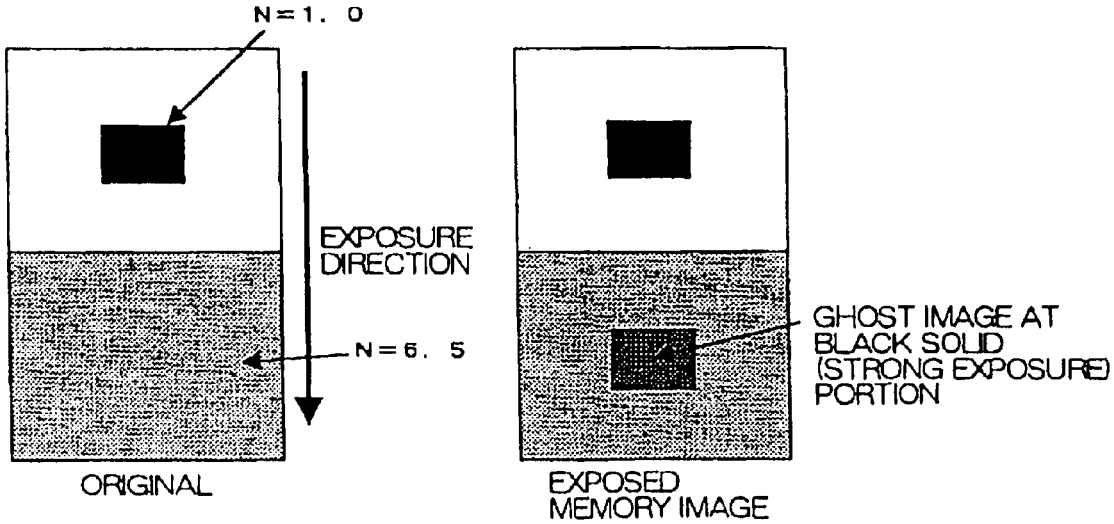
FIG. 3 is a diagram showing an original for evaluation of an exposure memory image, and an exposure memory image.

After the electrophotosensitive materials of the respective Examples and Comparative Examples were installed in a multifunction printer Antico 40 excluding a charge neutralizing lamp, manufactured by KYOCERA-MITA Co., Ltd., a printing test was carried out and it was visually judged whether an exposure memory image is generated or not. The exposure memory image refers to an image wherein a ghost image of the exposed portion was generated at the gray portion by a reduction in surface potential of the photosensitive material at the strongly exposed portion (black solid portion) in case where the printing test was carried out using an original as shown in FIG. 3.

TABLE 1

| | Kind of ETM | Plus polarity sensitivity (V) | Minus polarity sensitivity (V) | Difference in absolute value of sensitivity (V) | Transfer memory potential (V) | Exposure memory potential (V) | Transfer memory image | Exposure memory potential (V) |
|---|---|---|---|---|---|---|---|---|
| Example 1 | ET-1 | 132 | 150 | 18 | 15 | 10 | No memory image was generated | No memory image was generated |
| Example 2 | ET-2 | 141 | 290 | 149 | 20 | 26 | No memory image was generated | No memory image was generated |
| Example 3 | ET-3 | 144 | 341 | 197 | 30 | 32 | No memory image was generated | No memory image was generated |
| Example 4 | ET-4 | 150 | 352 | 202 | 26 | 10 | No memory image was generated | No memory image was generated |
| Example 5 | ET-5 | 131 | 153 | 22 | 15 | 25 | No memory image was generated | No memory image was generated |
| Example 6 | ET-6 | 205 | 322 | 117 | 35 | 32 | No memory image was generated | No memory image was generated |
| Example 7 | ET-7 | 252 | 550 | 298 | 35 | 36 | No memory image was generated | No memory image was generated |
| Example 8 | ET-8 | 223 | 704 | 481 | 25 | 44 | No memory image was generated | No memory image was generated |
| Comp. Example 1 | ET-9 | 131 | 652 | 521 | 55 | 66 | Lateral black band was generated | Ghost image was generated |
| Comp. Example 2 | ET-10 | 123 | 663 | 540 | 70 | 76 | Lateral black band was generated | Ghost image was generated |
| Comp. Example 3 | ET-11 | 130 | 661 | 531 | 85 | 90 | Lateral black band was generated | Ghost image was generated |

TABLE 2

| | Kind of ETM | Plus polarity sensitivity (V) | Minus polarity sensitivity (V) | Difference in absolute value of sensitivity (V) | Transfer memory potential (V) | Exposure memory potential (V) | Transfer memory image | Exposure memory potential (V) |
|---|---|---|---|---|---|---|---|---|
| Example 9 | ET-1 | 109 | 128 | 19 | 13 | 4 | No memory image was generated | No memory image was generated |
| Example 10 | ET-2 | 112 | 250 | 138 | 18 | 24 | No memory image was generated | No memory image was generated |
| Example 11 | ET-3 | 109 | 312 | 203 | 24 | 29 | No memory image was generated | No memory image was generated |
| Example 12 | ET-4 | 115 | 320 | 205 | 22 | 5 | No memory image was generated | No memory image was generated |
| Example 13 | ET-5 | 108 | **[[322]]** *122* | 14 | 13 | 25 | No memory image was generated | No memory image was generated |
| Example 14 | ET-6 | 173 | 290 | 117 | 32 | 30 | No memory image was generated | No memory image was generated |
| Example 15 | ET-7 | 211 | 523 | 312 | 33 | 30 | No memory image was generated | No memory image was generated |
| Example 16 | ET-8 | 189 | 675 | 486 | 20 | 42 | No memory image was generated | No memory image was generated |
| Comp. Example 4 | ET-9 | 100 | 623 | 523 | 56 | 60 | Lateral black band was generated | Ghost image was generated |
| Comp. Example 5 | ET-10 | 95 | 630 | 535 | 68 | 70 | Lateral black band was generated | Ghost image was generated |
| Comp. Example 6 | ET-11 | 103 | 620 | 517 | 90 | 86 | Lateral black band was generated | Ghost image was generated |

As is apparent from Table 1, Table 2 and FIG. 1, when a difference in absolute value between a plus polarity sensitivity and a minus polarity sensitivity is 500 V or less, both of a transfer memory potential and an exposure memory potential becomes 45 V or less so that no memory image is generated.

The disclosure of Japanese Patent Application Serial No. 11-302914, filed on Oct. 25, 1999, is incorporated herein by reference.

What is claimed is:

1. A single-layer type electrophotosensitive material comprising a conductive substrate and a photosensitive layer formed on the conductive substrate, characterized in that the photosensitive layer contains a phthalocyanine compound as an electric charge generating material, a hole transferring material and an electron transferring material in a binder resin, and that a difference in absolute value between a plus polarity sensitivity and a minus polarity sensitivity measured under the conditions of an exposure wavelength of 780 nm and an exposure energy of 1.0 μJ/cm$^2$ is not more than [[500 V]] 312 V, wherein the single-layer type electrophotosensitive material is used in a method including charging the electrophotosensitive material, exposing an image to form a static latent image, developing the static image to form a toner image, and transferring the toner image along a forward direction of the electrophotosensitive material, the method not including a charge neutralizing step.

2. The single-layer type electrophotosensitive material according to claim 1, wherein the absolute value of the plus polarity sensitivity is smaller than that of the minus polarity sensitivity.

3. The single-layer type electrophotosensitive material according to claim 2, which contains, as the hole transferring material, a compound represented by the general formula (1):

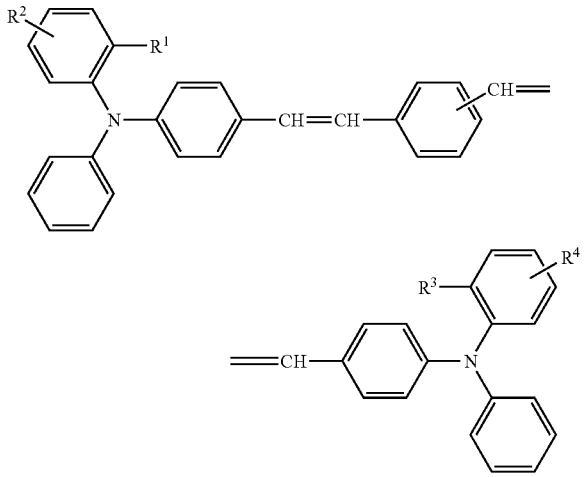

wherein $R^1$ and $R^3$ are the same or different and each represents an alkyl group which may have a substituent, an aryl group which may have a substituent, or an aralkyl or alkoxy group which may have a substituent; and $R^2$ and $R^4$ are the same or different and each represents a hydrogen atom, or an alkyl or alkoxy group which may have a substituent, provided that $R^2$ and $R^4$ are hydrogen atoms when $R^2$ and $R^4$ are substituted at the para-position.

4. The single-layer type electrophotosensitive material according to claim 2, which contains, as the electron transferring material, at least one selected from the group of compounds represented by the general formula (2):

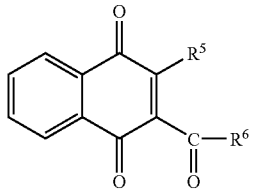

wherein $R^5$ represents a halogen atom, or an alkyl or aryl group which may have a substituent; and $R^6$ represents an alkyl or alkoxy group which may have a substituent, or a group: —O—$R^{6a}$, which represents an alkyl or aryl group which may have a substituent;

the general formula (3):

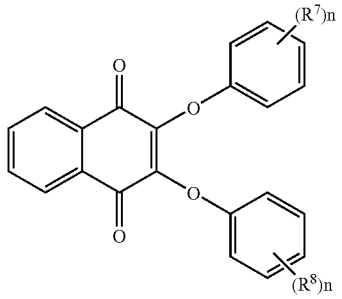

wherein $R^7$ and $R^8$ are the same or different and each represents an alkyl group, a halogenated alkyl group, an aryl group, an aralkyl group, an alkoxy group, an aryloxy group, an aralkyloxy group, an acyl group, an alkoxycarbonyl group, an aryloxycarbonyl group, an aralkyloxycarbonyl group, or a nitro group; and n represents an integer of 0 to 3;

the general formula (4):

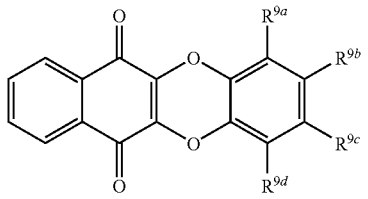

wherein $R^{9a}$, $R^{9b}$, $R^{9c}$ and $R^{9d}$ are the same or different and each represents a hydrogen atom, or an alkyl or aryl group which may have a substituent; and the general formula (5):

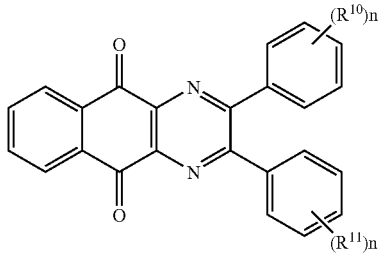

wherein $R^{10}$ and $R^{11}$ are the same or different and each represents an alkyl group, a halogenated alkyl group, an aryl group, an aralkyl group, an alkoxy group, an aryloxy group, an aralkyloxy group, an acyl group, an alkoxycarbonyl group, an aryloxycarbonyl group, an aralkyloxycarbonyl group, or nitro group; and n represents an integer of 0 to 3.

5. The single-layer type electrophotosensitive material according to claim 2, which contains, as the hole transferring material, a compound represented by the general formula (1) and, as the electron transferring material, a compound represented by the general formula (2).

6. The single-layer type electrophotosensitive material according to claim 2, wherein the content of the phthalocyanine compound is from 0.1 to 4.0% by weight based on the weight of the binder resin.

7. The single-layer type electrophotosensitive material according to claim 2, which contains, as the binder resin, a bisphenol Z type polycarbonate resin having a weight-average molecular weight of 15,000 to 100,000.

8. The single-layer type electrophotosensitive material according to claim 2, wherein the film thickness of the photosensitive layer is from 10 to 35 μm.

9. A method of producing a single-layer type electrophotosensitive material comprising a conductive substrate and a photosensitive layer formed on the conductive substrate, the photosensitive layer containing a phthalocyanine compound as an electric charge generating material, a hole transferring material and an electron transferring material in a binder resin, characterized in that the photosensitive layer is formed by selecting the phthalocyanine compound, hole transferring material, electron transferring material and binder resin so that a difference in absolute value between a plus polarity sensitivity and a minus polarity sensitivity is not more than [[500]] 312 V under the measuring conditions of an exposure wavelength of 780 nm and an exposure energy of 1.0 $\mu J/cm^2$.

10. The method of producing a single-layer type electrophotosensitive material according to claim 9, wherein said electron transferring material is at least one member selected from the group consisting of a compound of formula (2):

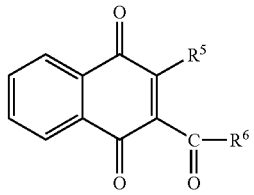

wherein $R^5$ represents a halogen atom, or an alkyl or aryl group which may have a substituent; and $R^6$ represents an alkyl or alkoxy group which may have a substituent, or a group: —O—$R^{6a}$, which represents an alkyl or aryl group which may have a substituent;

the formula (3):

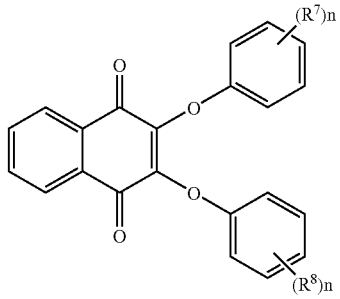

wherein $R^7$ and $R^8$ are the same or different and each represents an alkyl group, a halogenated alkyl group, an aryl group, an aralkyl group, an alkoxy group, an aryloxy group, an aralkyloxy group, an acyl group, an alkoxycarbonyl group, an aryloxycarbonyl group, an aralkyloxycarbonyl group, or a nitro group; and n represents an integer of 0 to 3;

the formula (4):

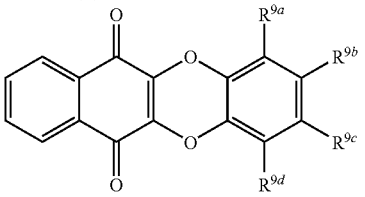

wherein $R^{9a}$, $R^{9b}$, $R^{9c}$ and $R^{9d}$ are the same or different and each represents a hydrogen atom, or an alkyl or aryl group which may have a substituent; and the formula (5):

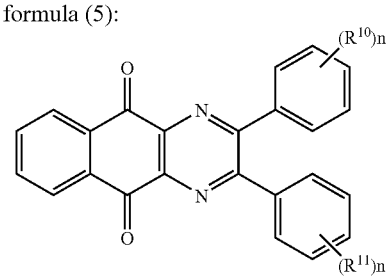

wherein $R^{10}$ and $R^{11}$ are the same or different and each represents an alkyl group, a halogenated alkyl group, an aryl group, an aralkyl group, an alkoxy group, an aryloxy group, an aralkyloxy group, an acyl group, an alkoxycarbonyl group, an aryloxycarbonyl group, an aralkyloxycarbonyl group, or nitro group; and n represents an integer of 0 to 3.

11. A method for reversal development in a digital image forming apparatus comprising charging [[the apparatus with]] the single-layer type electrophotosensitive material of claim 1, [[carrying out an exposure of]] exposing an image to form a static latent image, developing said static latent image to form a toner image, and transferring said toner image along a forward direction of the electrophotosensitive material, wherein a voltage is applied in the transferring which has a polarity reverse to a voltage to be applied in the charging*, further wherein the method does not include a charge neutralizing step*.

* * * * *